May 19, 1936.  A. RUZICKA  2,041,571

COLOR RECEPTACLE

Filed April 14, 1934

INVENTOR
Antony Ruzicka
BY
ATTORNEY

Patented May 19, 1936

2,041,571

UNITED STATES PATENT OFFICE 2,041,571

COLOR RECEPTACLE

Antony Ruzicka, Montreal, Quebec, Canada

Application April 14, 1934, Serial No. 720,665

5 Claims. (Cl. 91—66)

This invention relates to improvements in the art of coloring surfaces and particularly to means whereby decorators and painters can be provided with a surface covered with a suitable layer of coloring matter to be transferred by tools to the surfaces to be colored.

The object is to provide a receptacle to contain a supply of coloring matter, having an inner member adapted to be readily and rapidly coated with a layer of the coloring matter from the bottom of the receptacle.

A further object of the invention is to provide a receptacle of the above-mentioned character designed to insure the application of the proper and even amount of coloring matter to the stippling tools when they are applied to the freshly coated surface in the receptacle, thus facilitating the stippling and mottling of the surface desired.

A further object is to provide an efficient device, inexpensive to produce, durable in construction, and economical in the use of coloring matter.

Briefly the invention consists in a pan with its ends enlarged at the bottom, and a tray to be supported over the supply of coloring matter in the pan.

Reference is made to the accompanying drawing in which

Figure 1:
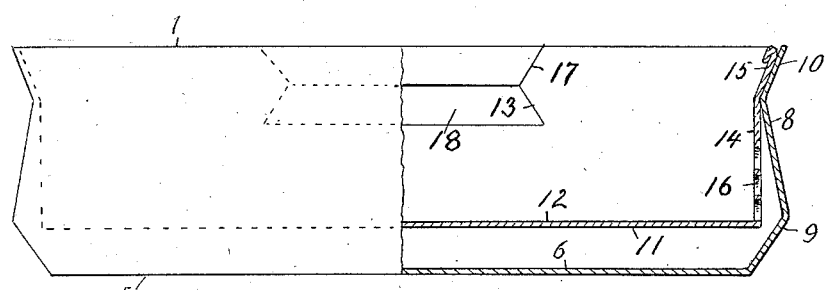
Figure 1 is a side elevation, partly in section.
Figure 2:
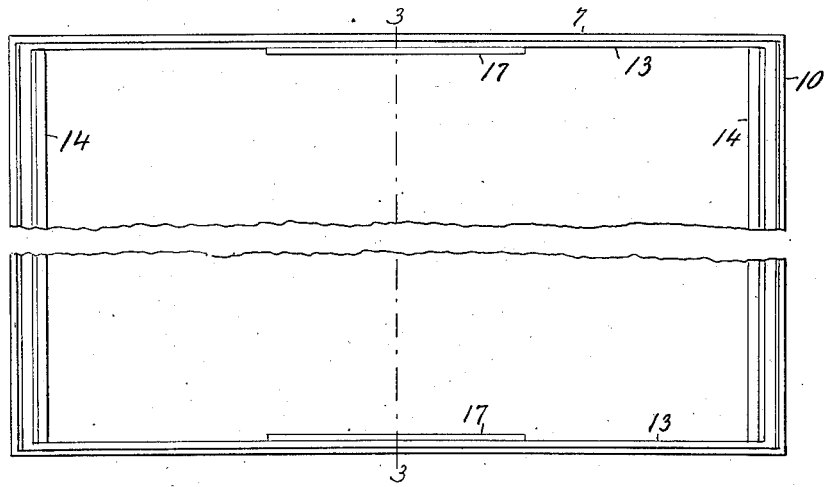
Figure 2 is a plan view.
Figure 3:
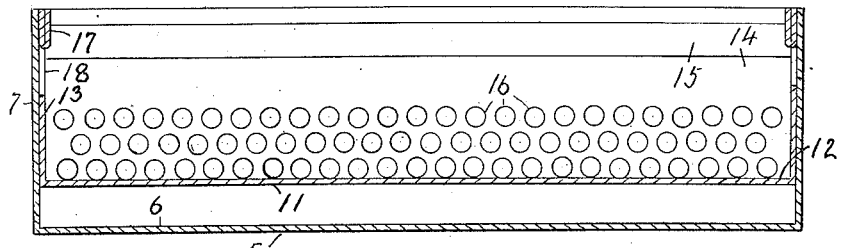
Figure 3 is a sectional view on the line 3—3 of Figure 2.

In the drawing, wherein for the purpose of illustration I have shown a preferred embodiment of my invention, the numeral 5 denotes a rectangular metal pan having a bottom wall 6, side walls 7 and end walls 8. The end walls 8 are bulged outwardly, as at 9, near the bottom of the pan, the bulged portions extending the entire width of the pan and being of angular shape in cross section. The upper edges of the end walls 8 are flared outwardly, as at 10. A tray 11 having a bottom wall 12, side walls 13 and end walls 14 is adapted to fit within the pan 5, the end walls 14 having their upper edges flared outwardly, as at 15, for contact with the flared edges 10 of the end walls 8 of the pan, so that the tray 11 is suspended in the pan, with its bottom 12 in spaced relation to the bottom 6 of the pan. The end walls 14 are provided with a series of horizontal rows of spaced apertures 16, the lower row of apertures being on a plane with the upper surface of the bottom 12 of the tray. The side walls 13 of the tray 11, intermediate their length and near the upper edge thereof, have struck out portions 17 which are bent upwardly against the walls, forming elongated openings 18, for gripping the tray to remove it from the pan.

In considering the use of the invention, as carried on by decorators the first step is to fill the pan 5 with a quantity of coloring matter sufficient to reach a level below the bottom of the tray 11 when in its position in the pan 5. When the pan 5 is tilted at either end the liquid coloring matter will flow over the edge of the tray 11 and cover its surface with an even layer of the liquid. After the tilting of the pan 5 has finished, any surplus will immediately drain off the surface of the tray 11 leaving the required layer of fresh liquid ready to be transferred by the decorator's tools. As the tilting of the pan 5 is done very rapidly a fresh layer of liquid is supplied without delay. As the tray 11 can be readily removed from the pan 5 there will be no obstruction in maintaining the liquid coloring matter in the required state of fluidity.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A color receptacle comprising a pan, and a flat tray suspended horizontally in said pan having apertures in the ends thereof, adapted to receive a layer of fluid over its surface.

2. A color receptacle comprising a pan, the ends of the pan having bulged out portions near the bottom thereof, and a tray suspended in said pan having apertures in the ends thereof.

3. A color receptacle comprising a pan having its ends bulged outwardly near the bottom thereof, and a tray suspended in said pan having its bottom spaced from the bottom of the pan, the ends of said tray having apertures opposite the bulged portions of the ends of the pan.

4. In a receptacle for colored fluid matter, a pan having a flat tray suspended over the bottom of the pan and means to pass a layer of the fluid from the pan across the tray.

5. In a receptacle for spreading a layer of fluid decorating matter, a pan having enlarged ends, a flat tray mounted over the bottom of the pan, and means to permit fluid to pass across the surface of the tray from the pan.

ANTONY RUZICKA.